United States Patent
Fujimura et al.

(10) Patent No.: US 6,530,825 B2
(45) Date of Patent: Mar. 11, 2003

(54) METHOD FOR THE PRODUCTION OF GLASS SUBSTRATES FOR MAGNETIC RECORDING MEDIUMS

(75) Inventors: Akio Fujimura, Saitama (JP); Toshio Hosaka, Saitama (JP); Junji Masunaga, Saitama (JP)

(73) Assignee: Mitsui Mining And Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/876,988

(22) Filed: Jun. 11, 2001

(65) Prior Publication Data

US 2002/0013121 A1 Jan. 31, 2002

(30) Foreign Application Priority Data

Jun. 9, 2000 (JP) .......................................... 2000-173382

(51) Int. Cl.[7] .................................................. B24B 1/00
(52) U.S. Cl. ........................................... 451/41; 451/57
(58) Field of Search ............................... 451/41, 56, 36, 451/60, 57, 59; 65/37, 61, 181

(56) References Cited

U.S. PATENT DOCUMENTS 6,254,461 B1 * 7/2001 Benning et al. ............... 451/56
6,287,175 B1 * 7/2001 Marukawa et al. ............ 451/41
6,371,834 B1 * 4/2002 Fujimura et al. .............. 451/41

FOREIGN PATENT DOCUMENTS

| JP | 6-226616 | 8/1994 |
|---|---|---|
| JP | 6-74259 | 10/1994 |
| JP | 9-193002 | 7/1997 |
| JP | 11-10522 | 1/1999 |
| JP | 11-254302 | 9/1999 |
| JP | 2000-135671 | 5/2000 |

* cited by examiner

*Primary Examiner*—George Nguyen
*Assistant Examiner*—Dung Van Nguyen
(74) *Attorney, Agent, or Firm*—Young & Thompson

(57) ABSTRACT

A method for the production of a glass substrate for magnetic recording mediums comprises the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu m$; then adhering abrasion cloths to the upper and lower surface tables, respectively; thereafter repeatedly polishing the surface of the glass substrate for magnetic recording mediums. The production method permits the efficient production of an excellent glass substrate for magnetic recording mediums.

18 Claims, No Drawings

METHOD FOR THE PRODUCTION OF GLASS SUBSTRATES FOR MAGNETIC RECORDING MEDIUMS

BACKGROUND OF THE INVENTION

1. Field of the Invention

The present invention relates to a method for the production of a glass substrate for magnetic recording mediums and more particularly to a production method capable of producing a glass substrate for magnetic recording mediums, which does not cause edge-sagging, to a substantial extent, at the periphery of the surface of the glass substrate on the side of the magnetic recording layer, which is smooth and uniform even to the outermost peripheral region on the surface of the glass substrate on the side of the magnetic recording layer and which has a substantially small quantity of surface defects.

2. Description of the Prior Art

As the conventional substrates for magnetic recording mediums, there have mainly been used those each prepared by plating an aluminum alloy plate with Ni—P and then polishing the plated main surface of the plate in a multiple step process.

However, the magnetic disk-recording device has recently been adopted even in the portable personal computer such as notebook-sized personal computers and the magnetic recording medium should be rotated at a high speed on the order of not less than 10,000 rpm in order to improve the response speed of the magnetic disk-recording device. For this reason, there has been desired for the development of a substrate for magnetic disk-recording mediums having high strength capable of withstanding such severe conditions. As such a substrate, which can satisfy the foregoing requirements, there has been adopted a glass substrate.

Such a mainly adopted glass substrate for magnetic recording mediums includes, for instance, a chemically strengthened glass substrate whose strength is improved by a chemical strengthening treatment or a crystallized glass substrate prepared by melting and a molding glass material to give a glass substrate, maintaining the glass substrate at a high temperature ranging from 600 to 800° C. over a long period of time to thus partially separate out crystalline phases in the substrate or a vitreous matrix.

The chemically strengthened glass substrate is, for instance, one obtained by melting a glass material and forming the melt into a glass substrate for chemically strengthened glass substrates, then subjecting the glass substrate to grinding and polishing treatments, and immersing it into a molten salt of, for instance, sodium nitrate or potassium nitrate to form a compression stressed layer in the surface layer thereof. The crystallized glass is one, which comprises 40 to 80% of crystalline phases and 20 to 60% of an amorphous glass phase and whose strength is improved by the action of the crystalline phase.

As the storage capacity of the magnetic disk-recording device has increasingly been high, there has been observed such a tendency that a magnetic recording layer is formed on the surface of a glass substrate for magnetic recording mediums even in the region in the proximity of the peripheral edge of the substrate on the side of the magnetic recording layer and the peripheral edge region thus formed is used as the magnetic recording layer, in order to improve the recording capacity per magnetic recording medium. For this reason, there has been desired for the establishment of high smoothness of the magnetic recording medium even in the region in the proximity of the peripheral edge thereof. Moreover, elements for magnetic recording mediums are significantly miniaturized to increase the recording density and therefore, it has likewise been required that defects on the glass substrate for magnetic recording mediums should be smaller and the number thereof should substantially be reduced.

In the polishing step when a glass substrate for magnetic recording mediums is produced by grinding and polishing such a glass material according to a well-known method, however, it is quite difficult to stably produce a glass substrate whose degree of the edge-sagging falls within the required range, by the use of a hard abrasion cloth such as a foamed polyurethane type one or a soft abrasion cloth such as a suede type one and an abrasion liquid containing about several percents of cerium-containing abrasive having an average particle size ranging from about 0.5 to 2 $\mu$m.

When a maker of polishing machines manufactures a both side-polishing device for polishing glass substrates for magnetic recording mediums, the maker in general adjusts the flatness of the surface of the surface table of the device to a level of not more than 50 $\mu$m by finishing through polishing. However, it is impossible to correct the flatness of the surface of the surface table, while fitting the upper and lower surface tables to the both side-polishing device practically used. For this reason, the surface tables whose flatness has been adjusted by the maker of polishing machines are used without any modification or adjustment. In general, the abrasion cloth used in such a both side-polishing device is an elastic material and therefore, the deformation, to some extent, of the surface of the table may be relieved due to the elasticity of the abrasion cloth. If the polishing step is continued while adhering an abrasion cloth to the surface of the surface table, however, the surface of the table undergoes deformation due to the pressure applied thereto during usage thereof and the heat generated by the polishing operations and the deformation reaches a level of not less than 100 $\mu$m in its early stages. In such a condition, the quantity of deformation of the table surface is greater than the quantity of the elasticity of the abrasion cloth and accordingly, the deformation of the table surface cannot be relieved by the elasticity of the abrasion cloth. As a result, the surface condition of the abrasion cloth is greatly influenced by the change or deformation of the surface condition (flatness) of the surface table and the polishing operations are continued while the parallel relation between the surface of the abrasion cloth fitted to the upper table and the surface of that fitted to the lower table falls into disorder. This leads to the extension of the time required for the completion of the polishing to a desired extent (this in turn results in the reduction of the number of glass substrates, which can be polished by an abrasion cloth). This also leads to the generation of surface defects on the glass substrate and becomes a principal cause of the edge-sagging.

SUMMARY OF THE INVENTION

The foregoing problems would easily be able to be solved if the surface of surface tables can be polished to thus improve the flatness of the surface, while the upper and lower surface tables are fitted to a both side-polishing device for polishing a glass substrate for magnetic recording mediums.

Accordingly, it is an object of the present invention to provide a method for the efficient production of a glass substrate for magnetic recording mediums, which does not cause any considerable degree of edge-sagging at the periphery of the surface thereof on the side of the magnetic recording layer, which is smooth even in the surface region near the outermost periphery of the surface on the side of the magnetic recording layer and which does not have surface defects to a substantial degree.

The inventors of this invention have conducted various studies to achieve the foregoing object, have found that the foregoing object of the invention can be accomplished by improving the conventionally well-known method, which comprises the steps of lapping a glass substrate for magnetic recording mediums to a desired thickness and then polishing the glass substrate, such that the surface of the upper and lower surface tables can easily be polished while fitting these surface tables to a both side-polishing device for polishing such a glass substrate, that the flatness precision of the outer surfaces of abrasion cloths can be improved by adhering these abrasion cloths to the surface of the corresponding upper and lower surface tables respectively and that the surface precision of the outer surfaces of abrasion cloths can further be improved by rubbing these abrasion cloths together and thus have completed the present invention.

According to a first aspect of the present invention, there is provided a method for the production of a glass substrate for magnetic recording mediums, which comprises the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively; thereafter repeatedly polishing the surface of the glass substrate for magnetic recording mediums.

According to a second aspect of the present invention, there is provided a method for the production of a glass substrate for magnetic recording mediums, which comprises the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively, sandwiching an abrasion board for correction between upper and lower abrasion cloths, rotating the upper and lower surface tables together with the abrasion cloths without supplying any cooling water to thus improve the flatness precision of the outer surface of the abrasion cloths; thereafter repeatedly polishing the surface of the glass substrate for magnetic recording mediums.

According to a third aspect of the present invention, there is provided a method for the production of a glass substrate for magnetic recording mediums, which comprises the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively, sandwiching an abrasion board for correction between upper and lower abrasion cloths, rotating the upper and lower surface tables together with the abrasion cloths without supplying any cooling water to thus improve the flatness precision of the outer surface of the abrasion cloths, then rubbing the upper and lower abrasion cloths together by rotating the upper and lower surface tables together with the abrasion cloths without using any abrasion board for correction to thus further improve the flatness precision of the outer surface of the abrasion cloths; thereafter repeatedly polishing the surface of the glass substrate for magnetic recording mediums.

In the method for the production of a glass substrate for magnetic recording mediums according to the present invention, the polishing of the glass substrate is repeatedly carried out according to the foregoing embodiment 1, 2 or 3, followed by removal of the abrasion cloths and then repetition of the production method according to the foregoing embodiment 1, 2 or 3, from the beginning.

DETAILED DESCRIPTION OF THE INVENTION

The present invention will hereunder be described in more detail.

In the production method according to the present invention, there may be used such abrasion boards for correction as metal-bonded grinding wheels, resinoid-bonded grinding wheels, vitreous material-bonded grinding wheels containing abrasive grains such as diamond, cubic boron nitride, boron carbide, silicon carbide, zirconia and alumina.

As has been described above, when a maker of polishing machines manufactures a both side-polishing device for polishing glass substrates for magnetic recording mediums, the maker in general adjusts the flatness of the surface of the surface table of the device to a level of not more than 50 $\mu$m by finishing through polishing. In this connection, the inventors of this invention have discovered that it is necessary to control the flatness of the surface of the surface table to a level of not more than 30 $\mu$m for the achievement of the foregoing object. The flatness of the table surface can easily be adjusted to not more than 30 $\mu$m and preferably not more than 10 $\mu$m, by using an abrasion board for correction such as those listed above, sandwiching abrasion boards between the upper and lower surface tables while these surface tables are fitted to a both side-polishing device for polishing a glass substrate for magnetic recording mediums, rotating the upper and lower surface tables in the opposite directions while supplying cooling water to thus polish the surface of the tables.

In the production method according to the present invention, the abrasion cloth may be those commonly used in the polishing step and more specifically, it may be either of a hard abrasion cloth such as foamed polyurethane type one or a soft abrasion cloth such as suede type one, but it is preferred to use the hard abrasion cloth since the use thereof makes the prevention of any edge-sagging easy and permits the polishing at a high polishing speed.

As means for adhering an abrasion cloth to the surface of a surface table, an adhesive can be used, but it is quite convenient to adhere, in advance, a double-sided tape onto the back face of an abrasive cloth and to fix the abrasion cloths to the upper and lower surface tables of a polishing device by means of the double-sided tape prior to the practical use of the abrasion cloth.

A glass substrate for magnetic recording mediums can repeatedly be polished while adhering an abrasion cloth to the table surface as has already been discussed above, but it is rather preferred to manage or monitor the degree of parallelization between the upper abrasion cloth and the lower abrasion cloth and the flatness of these abrasion cloths when the polishing step is carried out using the abrasion cloths adhered to the table surfaces. As a method for managing these physical properties, abrasion boards for correction are sandwiched between the upper and lower abrasion cloths as in the correction of the surface tables, the flatness precision of the outer face of the abrasion cloth is improved by rotating the upper and lower surface tables together with the abrasion cloths without supplying any cooling water to thus improve the degree of parallelization. At this stage, it would be more effective to control the rotational direction of the abrasion board for correction sandwiched between the upper and lower abrasion cloths. Thereafter, the upper and lower abrasion cloths are preferably rubbed together by rotating the upper and lower surface tables together with these abrasion cloths without using any abrasion board for correction to further improve the flatness precision of the outer surface of the abrasion cloths and to further improve the degree of parallelization.

As has been described above, if a glass substrate for magnetic recording mediums is polished by well-managing the flatness of the surface of surface tables as well as the flatness of abrasion cloths and the degree of parallelization thereof, the resulting glass substrate shows considerably low degree of edge-sagging as compared with glass substrate obtained by the usual polishing.

In this respect, if a glass substrate for magnetic recording mediums is repeatedly polished, it is common that 4 abrasion boards for correction are in general sandwiched between the upper and lower abrasion cloths initially or after repeating the polishing operations over desired times and then the outer surfaces of the abrasion cloths are polished by rotating the upper and lower surface tables in the opposite directions to thus control the surfaces of the abrasion cloths. This is also preferred in the production method of the present invention.

Moreover, the production method according to the present invention employs, as a polishing material, those used in the usual polishing operations such as cerium-containing polishing material having an average particle size ranging from 0.5 to 2 $\mu$m, which are used in the form of a polishing liquid containing the same in a solid content of several percentages.

The present invention will hereunder be described in more specifically with reference to the following Examples and Comparative Examples, but the present invention is not restricted to these specific Examples at all.

In the following Examples and Comparative Examples, the flatness and the edge-sagging are evaluated by the following methods:

Flatness:

A measuring tool was provided by assembling 3 Dial Gages (minimum scale: 1 $\mu$m; available from MITSUTOYO K.K.) so as to simultaneously determine the flatness at three positions on the surface table having distances of 50 mm, 200 mm and 350 mm from the outer periphery of the table fitted to a both side-polishing device for polishing a glass substrate for magnetic recording mediums, the dial gage was set at zero position on a reference plate, then flatness was determined at 4 positions at circumferential angles of 90 degrees (12 positions in all) and the maximum value was defined to be the intended flatness.

Edge-Sagging:

The size of Roll-off (in case of minus) or Ski Jump (in case of plus) as defined in IDEMA (International Disk Drive Equipment and Materials) Standard, Document No. D2-91 was measured using Surf Com 590A (a stylus surface roughness tester) available from Tokyo Seimitsu Co., Ltd.) and the quantity of deviation ($\mu$m) at a position corresponding to $\gamma$=31.5 mm from the reference line was assumed to be the intended edge-sagging. The edge-sagging values of three glass substrates (one position per substrate) were determined to thus obtain the average value of three measurements.

EXAMPLE 1 AND COMPARATIVE EXAMPLE 1

According to the procedures used for the production of the usual glass substrate for magnetic recording mediums, a lithium silicate crystallized glass plate (TS-10SX available from K. K. OHARA; the glass comprises 70 to 80% of quartz-cristobalite and the balance of an amorphous phase) was subjected to inner and outer diameter processing and lapping steps to form a large number of doughnut-like substrates having an outer diameter of 65 mm, an inner diameter of 20 mm and a thickness of 0.68 mm.

Pellets comprising diamond grains having a grain size ranging from 40 to 60 $\mu$m dispersed in a nickel alloy matrix were fitted to both sides of an aluminum alloy board having a diameter of 420 mm at a density of 60 pellets per side to form an abrasion board for correction. The abrasion boards for correction (4 sheets) thus produced were sandwiched between the upper and lower surface tables of a 16B both side-polishing device (available from Hamai Co., Ltd.) while these upper and lower surface tables were fitted to the polishing device and then the upper and lower surface tables were rotated in the opposite directions while supplying cooling water to polish the surface of these tables. In this connection, the polishing operations were carried out under the following conditions: rotational numbers of the upper and lower surface tables were set at 20 rpm, respectively; the load applied was 1470N; and the polishing time was set at 20 minutes.

The flatness of the table surface prior to the polishing was found to be 40 $\mu$m, but that observed after the polishing was improved and found to be 10 $\mu$m.

As an abrasion cloth, MHC 15A (foamed urethane; available from Rodel Nitta Co., Ltd.) was adhered to the surface of the surface tables, whose surface flatness had been improved, using a double-sided tape. Prior to repeatedly polishing the glass substrate for magnetic recording mediums, the foregoing abrasion boards for correction (4 sheets) were sandwiched between the upper and lower abrasion cloths and the upper and lower surface tables were rotated in the opposite directions, while supplying cooling water, to thus polish the outer surface of the abrasion cloths and to control the surface of the abrasion cloths. In this connection, the polishing operations were carried out under the following conditions: rotational numbers of the upper and lower surface tables were set at 60 rpm, respectively; the load applied was 980N; and the polishing time was set at 20 minutes.

Then the forgoing doughnut-like substrates were polished using, as a polishing material, Mirek 801 ($CeO_2$-containing abrasive available from Mitsui Mining and Smelting Co., Ltd.; $D_{5\,0}$=1.5 $\mu$m). In this connection, the polishing operations were carried out under the following conditions: rotational numbers of the upper and lower surface tables were set at 40 rpm, respectively; the load applied was 980 Pa; and the quantity of polishing was found to be 15 $\mu$m per side.

This polishing operation was repeated 5 times and the edge-sagging for each polishing operation was determined. The results thus obtained are listed in the following Table 1:

TABLE 1

| Number of Polishing Operation | Roll-Off Value($\mu$m) |
|---|---|
| 1 | 0 |
| 2 | 0 |
| 3 | 0.025 |
| 4 | 0.025 |
| 5 | 0.05 |

Separately, the foregoing doughnut-like substrates were polished according to the same procedures used above except that MHC 15A (foamed urethane available from Rodel Nitta Co., Ltd.) was adhered to the surfaces of surface tables prior to the improvement of the surface flatness thereof using a double-sided tape. This polishing operation was repeated 5 times and the edge-sagging for each polishing operation was determined. The results thus obtained are listed in the following Table 2:

TABLE 2

| Number of Polishing Operation | Roll-Off Value($\mu$m) |
|---|---|
| 1 | 0.2 |
| 2 | 0.15 |
| 3 | 0.25 |
| 4 | 0.25 |
| 5 | 0.3 |

EXAMPLE 2

The upper and lower surface tables of a 16B both side-polishing device (available from Hamai Co., Ltd.) were polished under the same conditions used in Example 1. At this stage, the surface flatness of the surface tables as determined along its radial direction was found to be 10 $\mu$m.

As an abrasion cloth, MHC 15A (foamed urethane; available from Rodel Nitta Co., Ltd.) was adhered to the surface of the surface tables whose surface flatness had been improved using a double-sided tape. Then the abrasion boards for correction (4 sheets) used in Example 1 were sandwiched between the upper and lower abrasion cloths and the upper and lower surface tables were rotated in the opposite directions without supplying any cooling water to thus polish the outer surface of the abrasion cloths and to improve the surface flatness of the abrasion cloths. In this connection, the polishing operations were carried out under the following conditions: rotational numbers of the upper and lower surface tables were set at 20 rpm, respectively; the load applied thereto was 1470N; and the polishing time was set at 30 minutes.

Prior to repeatedly polishing the glass substrate for magnetic recording mediums, the foregoing abrasion boards for correction (4 sheets) were sandwiched between the upper and lower abrasion cloths and the upper and lower surface tables were rotated in the opposite directions while supplying cooling water to thus polish the outer surface of the abrasion cloths and to control the surface of the abrasion cloths. In this connection, the polishing operations were carried out under the following conditions: rotational numbers of the upper and lower surface tables were set at 60 rpm, respectively; the load applied was 980N; and the polishing time was set at 20 minutes.

Then the foregoing doughnut-like substrates were polished using, as a polishing material, Mirek 801 ($CeO_2$-containing abrasive available from Mitsui Mining and Smelting Co., Ltd.; $D_{5\ 0}=1.5$ $\mu$m). In this connection, the polishing operations were carried out under the following conditions: rotational numbers of the upper and lower surface tables were set at 40 rpm, respectively; the load applied was 980 Pa; and the quantity of polishing was found to be 15 $\mu$m per side. This polishing operation was repeated 5 times and the edge-sagging for each polishing operation was determined. The results thus obtained are listed in the following Table 3:

TABLE 3

| Number of Polishing Operation | Roll-Off Value($\mu$m) |
|---|---|
| 1 | 0 |
| 2 | 0 |
| 3 | 0 |
| 4 | 0 |
| 5 | 0.05 |

EXAMPLE 3

The upper and lower surface tables of a 16B both side-polishing device (available from Hamai Co., Ltd.) were polished under the same conditions used in Example 1 and the outer surface of the abrasion cloths were polished under the same conditions used in Example 2 to thus improve the surface flatness thereof. Then the upper and lower abrasion cloths were rubbed together by rotating the upper and lower surface tables together with the abrasion cloths without using any abrasion board for correction to improve the flatness precision of the outer surface of the abrasion cloths. In this connection, the polishing operations were carried out under the following conditions: rotational numbers of the upper and lower surface tables were set at 30 rpm, respectively; the load applied was 980N; and the polishing time was set at 10 minutes.

Prior to repeatedly polishing the glass substrate for magnetic recording mediums, the foregoing abrasion boards for correction (4 sheets) were sandwiched between the upper and lower abrasion cloths and the upper and lower surface tables were rotated in the opposite directions while supplying cooling water to thus polish the outer surface of the abrasion cloths and to control the surface of the abrasion cloths. In this connection, the polishing operations were carried out under the following conditions: rotational numbers of the upper and lower surface tables were set at 60 rpm, respectively; the load applied was 980N; and the polishing time was set at 20 minutes.

Then the foregoing doughnut-like substrates were polished using, as a polishing material, Mirek 801 ($CeO_2$-containing abrasive available from Mitsui Mining and Smelting Co., Ltd.; $D_{5\ 0}=1.5$ $\mu$m). In this connection, the polishing operations were carried out under the following conditions: rotational numbers of the upper and lower surface tables were set at 40 rpm, respectively; the load applied was 980 Pa; and the quantity of polishing was found to be 15 $\mu$m per side. This polishing operation was repeated 5 times and the edge-sagging for each polishing operation was determined. The results thus obtained are listed in the following Table 4:

TABLE 4

| Number of Polishing Operation | Roll-Off Value($\mu$m) |
| --- | --- |
| 1 | 0 |
| 2 | 0 |
| 3 | 0 |
| 4 | 0 |
| 5 | 0 |

As has been described above in detail, the production method according to the present invention permits the efficient production of an excellent glass substrate for magnetic recording mediums. The resulting glass substrate for magnetic recording mediums does not have any significant degree of edge-sagging even in the peripheral region of the surface of the glass substrate on the side of the magnetic recording layer, glass substrate is also excellent in smoothness or flatness and uniformity of the surface even in the region thereof in the proximity of the outermost periphery on the side of the magnetic recording layer and the glass substrate does not have any significant amount of surface defects.

What is claimed is:

1. A method for the production of a glass substrate for magnetic recording mediums comprising the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively; thereafter repeatedly polishing the surface of the glass substrate for magnetic recording mediums.

2. A method for the production of a glass substrate for magnetic recording mediums comprising the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively, sandwiching an abrasion board for correction between upper and lower abrasion cloths, rotating the upper and lower surface tables together with the abrasion cloths without supplying any cooling water to thus improve the flatness precision of the outer surface of the abrasion cloths; thereafter repeatedly polishing the surface of the glass substrate for magnetic recording mediums.

3. A method for the production of a glass substrate for magnetic recording mediums comprising the steps of sandwiching an abrasion board for correction between upper and lower surface tables of a both side-polishing device for polishing the glass substrate, while these upper and lower surface tables are fitted to the polishing device, rotating the upper and lower surface tables in the opposite directions while supplying cooling water to thus polish the surface of these tables to a flatness of the table surface on the order of not more than 30 $\mu$m; then adhering abrasion cloths to the upper and lower surface tables, respectively, sandwiching an abrasion board for correction between upper and lower abrasion cloths, rotating the upper and lower surface tables together with the abrasion cloths without supplying any cooling water to thus improve the flatness precision of the outer surface of the abrasion cloths, then rubbing the upper and lower abrasion cloths together by rotating the upper and lower surface tables together with the abrasion cloths without using any abrasion board for correction to thus further improve the flatness precision of the outer surface of the abrasion cloths; thereafter repeatedly polishing the surface of the glass substrate for magnetic recording mediums.

4. The method for the production of a glass substrate for magnetic recording mediums as set forth in claim 1, wherein the polishing of the glass substrate is repeatedly carried out according to the foregoing method as set forth in claim 1, followed by removal of the abrasion cloths and then repetition of the production method as set forth in claim 1, from the beginning.

5. The method for the production of a glass substrate for magnetic recording mediums as set forth in claim 1, wherein the polishing of the glass substrate is repeatedly carried out according to the foregoing method as set forth in claim 1, followed by removal of the abrasion cloths and then repetition of the production method as set forth in claim 2, from the beginning.

6. The method for the production of a glass substrate for magnetic recording mediums as set forth in claim 1, wherein the polishing of the glass substrate is repeatedly carried out according to the foregoing method as set forth in claim 1, followed by removal of the abrasion cloths and then repetition of the production method as set forth in claim 3, from the beginning.

7. The method for the production of a glass substrate for magnetic recording mediums as set forth in claim 2, wherein the polishing of the glass substrate is repeatedly carried out according to the foregoing method as set forth in claim 2, followed by removal of the abrasion cloths and then repetition of the production method as set forth in claim 1, from the beginning.

8. The method for the production of a glass substrate for magnetic recording mediums as set forth in claim 2, wherein the polishing of the glass substrate is repeatedly carried out according to the foregoing method as set forth in claim 2, followed by removal of the abrasion cloths and then repetition of the production method as set forth in claim 2, from the beginning.

9. The method for the production of a glass substrate for magnetic recording mediums as set forth in claim 2, wherein the polishing of the glass substrate is repeatedly carried out according to the foregoing method as set forth in claim 2, followed by removal of the abrasion cloths and then repetition of the production method as set forth in claim 3, from the beginning.

10. The method for the production of a glass substrate for magnetic recording mediums as set forth in claim 3, wherein the polishing of the glass substrate is repeatedly carried out according to the foregoing method as set forth in claim 3, followed by removal of the abrasion cloths and then repetition of the production method as set forth in claim 1, from the beginning.

11. The method for the production of a glass substrate for magnetic recording mediums as set forth in claim 3, wherein the polishing of the glass substrate is repeatedly carried out according to the foregoing method as set forth in claim 3, followed by removal of the abrasion cloths and then repetition of the production method as set forth in claim 2, from the beginning.

12. The method for the production of a glass substrate for magnetic recording mediums as set forth in claim 3, wherein the polishing of the glass substrate is repeatedly carried out according to the foregoing method as set forth in claim 3, followed by removal of the abrasion cloths and then repetition of the production method as set forth in claim 3, from the beginning.

13. The method as set forth in claim 1, wherein the abrasion board is a metal-bonded grinding wheel or a resinoid-bonded grinding wheel containing abrasive grains of diamond, cubic boron nitride, boron carbide, silicon carbide, zirconia and alumina.

14. The method as set forth in claim 2, wherein the abrasion board is a metal-bonded grinding wheel or a resinoid-bonded grinding wheel containing abrasive grains of diamond, cubic boron nitride, boron carbide, silicon carbide, zirconia and alumina.

15. The method as set forth in claim 3, wherein the abrasion board is a metal-bonded grinding wheel or a resinoid-bonded grinding wheel containing abrasive grains of diamond, cubic boron nitride, boron carbide, silicon carbide, zirconia and alumina.

16. The method as set forth in claim 4, wherein the abrasion board is a metal-bonded grinding wheel or a resinoid-bonded grinding wheel containing abrasive grains of diamond, cubic boron nitride, boron carbide, silicon carbide, zirconia and alumina.

17. The method as set forth in claim 8, wherein the abrasion board is a metal-bonded grinding wheel or a resinoid-bonded grinding wheel containing abrasive grains of diamond, cubic boron nitride, boron carbide, silicon carbide, zirconia and alumina.

18. The method as set forth in claim 12, wherein the abrasion board is a metal-bonded grinding wheel or a resinoid-bonded grinding wheel containing abrasive grains of diamond, cubic boron nitride, boron carbide, silicon carbide, zirconia and alumina.

* * * * *